United States Patent
Schanz et al.

(10) Patent No.: US 6,198,086 B1
(45) Date of Patent: Mar. 6, 2001

(54) IMAGE SIGNAL SENSING PROCESS INCLUDING ALTERING CHARGES OF CAPACITANCES

(75) Inventors: Michael Schanz, Oberhausen; Bedrich Hosticka, Duisburg; Reiner Wertheimer, Herrsching; Hakan Kisakürek, München, all of (DE)

(73) Assignees: Fraunhofer-Gesellschaft zur Förderung der angewandten; Bayerische Motoren Werke AG; Bodenseewerk Gerätetechnik GmbH, all of (DE)

( * ) Notice: Subject to any disclaimer, the term of this patent is extended or adjusted under 35 U.S.C. 154(b) by 0 days.

(21) Appl. No.: 09/254,133
(22) PCT Filed: Oct. 24, 1997
(86) PCT No.: PCT/EP97/05899
  § 371 Date: Apr. 30, 1999
  § 102(e) Date: Apr. 30, 1999
(87) PCT Pub. No.: WO98/19454
  PCT Pub. Date: May 7, 1998

(30) Foreign Application Priority Data

Oct. 25, 1996 (DE) .............................. 196 44 479

(51) Int. Cl.$^7$ .................................................. H01L 27/00
(52) U.S. Cl. ........................................ 250/208.1; 348/297
(58) Field of Search ........................... 250/208.1, 214 R, 250/214 P; 348/314, 295, 297; 257/297, 298, 296

(56) References Cited

U.S. PATENT DOCUMENTS

| | | | |
|---|---|---|---|
| 4,079,422 | * 3/1978 | Anagnostopoulos | 250/578 |
| 4,479,062 | 10/1984 | Kawasaki et al. | 280/578 |
| 5,236,871 | 8/1993 | Fossum et al. | 437/195 |
| 5,386,128 | 1/1995 | Fossum et al. | 257/183.1 |
| 5,471,515 | 11/1995 | Fossum et al. | 257/239 |
| 5,548,773 | 8/1996 | Kemeny et al. | |

FOREIGN PATENT DOCUMENTS

WO 90/01844   2/1990   (WO).

OTHER PUBLICATIONS

D. Renshaw et al., "ASIC Image Sensors," 1990 IEEE International Symposium On Circuits and Systems, p. 3038–3041, (May 1–3, 1990).

* cited by examiner

*Primary Examiner*—Que T. Le
(74) *Attorney, Agent, or Firm*—Duft, Graziano & Forest, P.C.

(57) ABSTRACT

In a method for detecting an image signal by means of an array (30) of photosensitive devices (10) with each of which the charge of a capacitance (12) can be altered, an optical signal (20) of each photosensitive device is first detected by means of the following substeps: creating a charge condition of the capacitance with a predetermined voltage (+U_DD), changing the charge of the capacitance (12) either with a photocurrent generated in the photosensitive device (10) by the optical signal (20) or with a quantity derived from the same and detecting the voltage across the capacitance (12) after a predetermined time period, deciding whether the detected voltage lies within a valid range and, if this is so, determining on the basis of the detected voltage a valid signal which characterizes the detected optical signal, and, if this is not so, repeating the cited steps with a time period which differs from the predetermined time period either a predetermined number of times or until it is determined that the detected voltage lies in a valid range. Subsequently the optical signal detected for each photosensitive device (10) is stored together with the time period for which a valid signal has been detected. Finally the image signal is obtained from the stored optical signals for the individual photosensitive devices and the respective assigned time periods.

6 Claims, 2 Drawing Sheets

IMAGE SIGNAL SENSING PROCESS INCLUDING ALTERING CHARGES OF CAPACITANCES

DESCRIPTION

Figure 1:
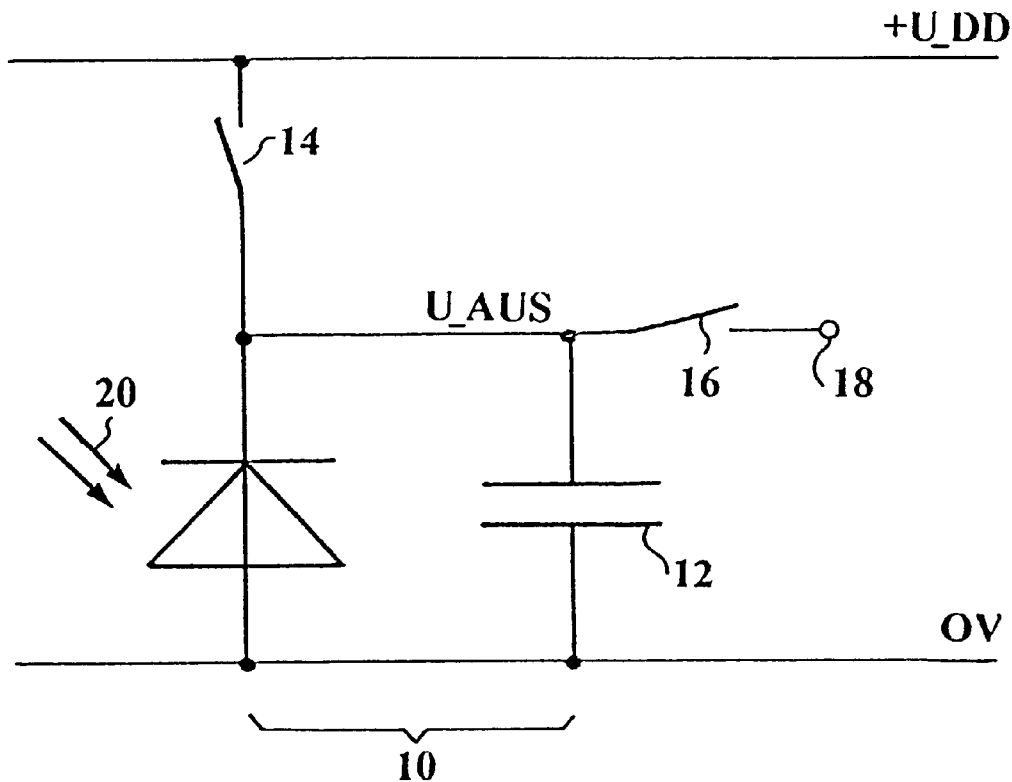

The present invention relates to a method for detecting an image signal by means of an array of photosensitive devices with each of which the charge of a capacitance can be altered.

In monolithic integrated image sensor systems, arrays of sensor elements are usually fabricated together with the electronics for signal readout on an integrated circuit (IC). In the field of integrated optical sensors, photodiodes, bipolar phototransistors, charge-coupled devices (CCDS) and light-sensitive MOS transistors can be used as light-sensitive devices. The light-dependent signals, i.e. the charge, the voltage or the current, of the arrays of the above-named devices are normally read out and subsequently converted to a digital signal and processed further. Alternatively, these light-dependent signals can be displayed directly without an analogue/digital conversion.

The process of reading out image signals by means of an integrating method is known. For example, a signal current of a light-sensitive device is here integrated onto a capacitance over a certain period of time. As a result of this integration, a signal voltage proportional to the illumination intensity and to the time period is generated, which can then be read out easily from a peripheral circuit on the integrated circuit. In one example of a light-sensitive device according to the prior art, a capacitance which was initially charged with a predetermined potential is discharged by a photocurrent generated by the light-sensitive device.

In some applications, for example in the automobile branch, where there are frequent changes in brightness conditions and strong differences in brightness within an image, the demands made on the dynamics of the image signals are very great. Image signal dynamics of this order, a consequence of too strong a variation in the illumination intensity within an image, cannot be achieved by the method according to the prior art described above. If, for example, the illumination intensity is too high for certain image sensor elements, the voltage of the capacitance initially charged with a predetermined voltage drops very quickly, so that, after the time period during which the capacitance is discharged by the signal current of the light-sensitive device has elapsed, it is no longer possible to assess how high the incident illumination intensity was initially if the capacitance has discharged completely on termination of the time period. The known method thus exhibits a limited dynamic range.

U.S. Pat. No. 4,479,062 describes an apparatus for photoelectrical conversion in which an array of light-receiving elements is provided in order to accumulate information relating to incident light. The known apparatus has a saturation detection device for detecting a saturation of an output signal of the light-receiving element array. If the output signal of the light-receiving element array is saturated, the accumulation time is reduced. According to U.S. Pat. No. 4,479,062 the detection time is reduced progressively until none of the image-receiving elements of the image-receiving element array is oversaturated, i.e. until the output signal of the light-receiving element array no longer exceeds a saturation level. When the output signal of the light-receiving element array no longer exceeds the saturation level, all the image sensor elements provide a valid signal, whereupon the image acquired with the integration time which was ascertained last is then evaluated.

The method known from U.S. Pat. No. 4,479,062 is disadvantageous in that, despite the effort involved in multiple image acquisition, the resulting image may have image sensor elements having a low signal/noise ratio, e.g. image sensor elements with low brightness values. For an observer, however, it is advantageous if the signal/noise ratio for an acquired real scene is as large as possible. For the observer a large signal/noise ratio means that objects which are static and not subject to fluctuations in illumination really do have a static appearance in the image, and that it is possible to resolve low contrasts within a scene. A further disadvantage of the known method is that the dynamic range for the totality of all the image sensor elements of the acquired image is restricted to the physically limited dynamic range, i.e. the ratio of the maximum signal to the equivalent noise signal, of a single image sensor element for an image acquisition. For an observer, a high dynamic range means that both very bright and also very dark regions of a real scene can be represented without appearing equally bright or equally dark from a certain threshold on.

It is the object of the present invention to provide a method for detecting an optical signal that exhibits an increased dynamic range and increased precision.

This object is achieved by a method according to claim 1.

The present invention provides a method for detecting an image signal by means of an array of photosensitive devices, with each of which the charge of a capacitance can be altered, wherein at first an optical signal of each photosensitive device is detected by means of the following substeps: creating a charge condition of the capacitance with a predetermined voltage, changing the charge of the capacitance either with a photocurrent generated in the photosensitive device by the optical signal or with a quantity derived from the same and detecting the voltage across the capacitance after a predetermined time period, deciding whether the detected voltage lies within a valid range and, if this is so, determining on the basis of the detected voltage a valid signal which characterizes the detected optical signal, and, if this is not so, repeating the cited steps with a time period which differs from the predetermined time period either a predetermined number of times or until it is determined that the detected voltage lies in a valid range. Subsequently the optical signal detected for each photosensitive device is stored together with the time period for which a valid signal has been detected. Finally the image signal is obtained from the stored optical signals for the individual photosensitive devices and the respective assigned time periods.

In an embodiment of the method according to the present invention it is decided in the decision step that the detected voltage does not lie in the valid range if the detected voltage corresponds to a complete discharge of the capacitance. In this case the time period after which the voltage is detected, which differs from the predetermined time period, is reduced for each repetition.

The method according to the present invention provides an extension of the dynamic range in the detection of optical signals, e.g. when imaging by means of an image sensor array consisting of image sensor elements. The method according to the present invention prevents departure from the operating range, i.e. an overdriving, of individual image sensor elements and also an overdriving of the complete image sensor array.

According to the present invention it is thus decided, after each image acquisition, whether a valid signal exists for each image sensor element. If this is so, the value of the respective image sensor element, together with the information on the integration time, is stored e.g. in an intermediate memory. This is also carried out even if there have already been invalid signals of image sensor elements in this partial image. The control of the brightness values and information on the integration time can e.g. be realized by means of a digital processor.

In preferred embodiments of the present invention, acquisition of a partial image commences with the greatest sensitivity, i.e. with the longest integration time. This ensures that all the image sensor elements exhibit a maximum signal/noise ratio in the prevailing circumstances. If subsequently, for a curtailed integration time, remaining image sensor elements are still overdriven, i.e. do not exhibit valid signals, the image sensor elements in the intermediate memory can e.g. adopt the maximum representable value or the chosen integration times can be curtailed, if desired.

The result of this multiple acquistion of images is a composite image of image sensor elements which is made up of partial images which may have been acquired with different integration times. In order to be able to evaluate the image, it is clear that, in a further step, the brightness values and information on the integration time must be coordinated with one other so that the correct brightness information is obtained for each image sensor element. This coordination could e.g. be achieved using software.

The method according to the present invention improves not only the signal/noise ratio for each image sensor element but also the dynamic range of the totality of all the image sensor elements contained in the image. For instance, a single image sensor element may possess a dynamic range, defined here as the ratio of maximum signal to the equivalent noise signal, of 60 dB, a typical value for photodiodes. If now several images are acquired with different integration times, i.e. sensitivities, the variation of the integration time comprises e.g. 1 ms to 10 $\mu$s, which corresponds to 40 dB. The resulting dynamic range for the totality of all the image sensor elements contained in the image, which is obtained by simply adding together both dynamic values, is then 60 dB+40 dB=100 dB.

Figure 2A:
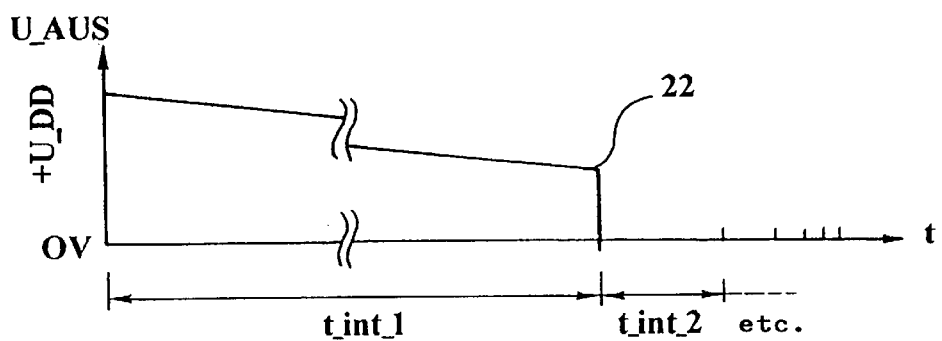
Figure 2B:
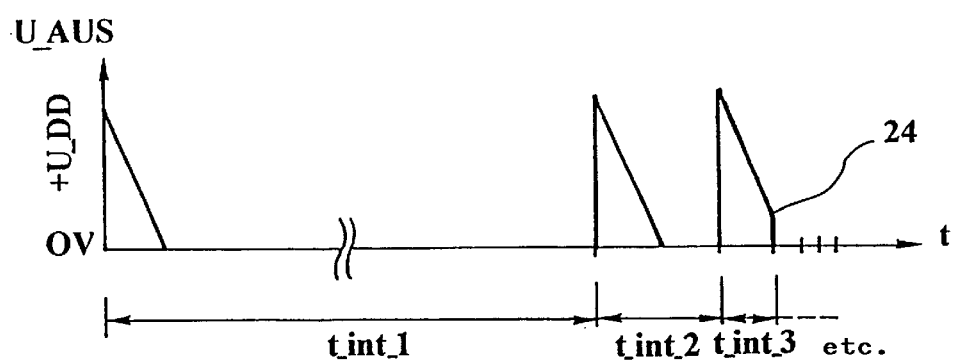
Figure 3:
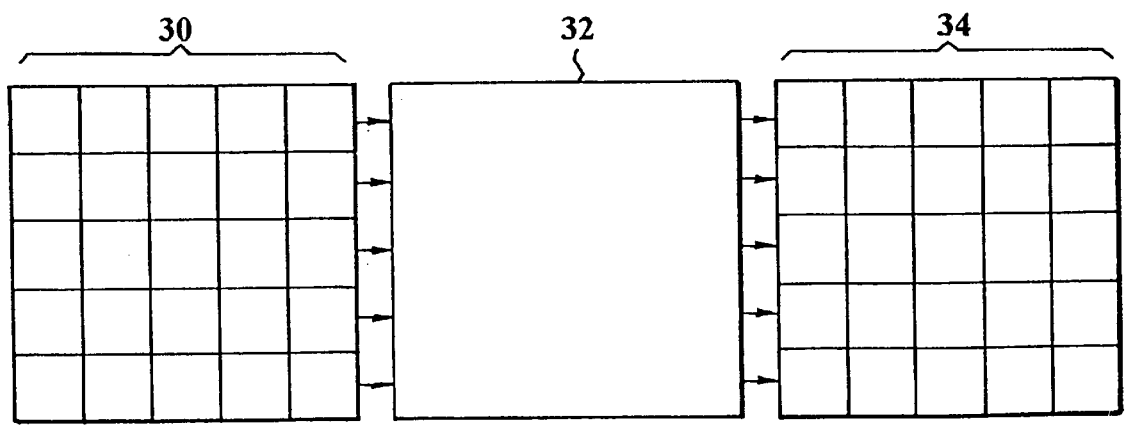

Preferred embodiments of the present invention will be described in more detail below making reference to the enclosed drawings, in which FIG. 1 shows an image sensor element which is suitable for use in the method according to the present invention;

FIGS. 2A and 2B show time schematics of a signal detection to clarify the method according to the present invention; and FIG. 3 shows a schematic representation which clarifies the way in which the optical signals detected by means of the method according to the present invention can be evaluated further.

The present invention will be described below in the light of a preferred embodiment of the same wherein a photodiode is used as image sensor element. In FIG. 1 a photodiode 10 is shown, the blocking layer capacitance 12 of the same being shown as a discrete element for the sake of clarity. The cathode of the photodiode 10 is connectable to a potential +U_DD via a switch 14. The anode of the photodiode 10 is connected to a potential of 0V, i.e. ground. The cathode of the photodiode 10 is further connectable to an output terminal 18 via a switch 16.

At the start of the readout process, the switch 14 is first closed, while the switch 16 is open, whereby an output voltage U_aus is set back to the voltage U_DD and the blocking layer capacitance 12 of the photodiode 10 is charged to the voltage U_DD. The switch 14 is then opened.

By means of an illumination 20, which is produced by an optical signal, e.g. an image signal with a certain illumination intensity, a photocurrent is now generated in the photodiode 10 and integrated onto the blocking layer capacitance 12 of the photodiode 10. Due to this signal current generated by illumination, the voltage U_aus falls with time. After a fixed predetermined time period, the switch 16 is closed. The resulting signal voltage U_aus, which is characteristic of the illumination falling on the photodiode 10, can thereby be read out at the output terminal 18.

The method according to the present invention now consists of integrating several times in succession the signal of each image sensor element in an image sensor array, where the photodiode shown in FIG. 1 represents such an image sensor element, and to decide whether each of these is a valid signal, different integration times being used for the integrations each time. A valid signal is available when the output voltage U_aus lies within a valid range.

The way in which the voltage U_aus at the output node 18 varies with time for the image sensor element depicted in FIG. 1 is shown in FIGS. 2A and 2B. The image sensor element depicted in FIG. 1 supplies a valid output signal all the while the blocking layer capacitance 12 has not discharged itself completely at the moment of readout. In FIG. 2A the photodiode is subjected to a low illumination intensity, so that, after the integration time, i.e. the detection time t_int_1, the blocking layer capacitance 12 is not fully discharged. Thus, after the time t_int_1, a valid output signal 22 is obtained, which is proportional to the illumination intensity to which the photodiode is subjected and proportional to the time period over which the photocurrent is integrated, i.e. during which the capacitance is discharged. A renewed detection over a shorter time period t_int_2 is not necessary in this case, i.e. at the low illumination intensity.

The voltage U_aus against time for a large illumination intensity to which the photodiode is subjected is shown in FIG. 2B. The capacitance is thus discharged quickly from the voltage +U_DD to the voltage 0V. Therefore no valid output signal is obtained during the time period t_int_1. As a result a further detection is performed during a time period t_int_2, which is shorter than the time period t_int_1. At the moment of readout after this second time period the capacitance is also already fully discharged. Thus there is again no valid signal. Only with a further reduction in the detection time period, i.e. t_int_3, is the capacitance not fully discharged at the moment of detection. Thus a valid output signal is obtained at the end of the third time period t_int_3.

Through the increasing reduction in the integration time, i.e. in the detection time period, when the previous detections do not provide a valid output signal, the dynamic range is increased for the totality of all the image sensor elements in the image.

FIG. 3 shows an apparatus which can be used to evaluate image information acquired by means of an image sensor array. An image sensor array 30, which consists of individual image sensor elements, each of which detects an optical signal, twenty five of which are shown for the sake of example in FIG. 3, is connected via a control circuit 32 to an intermediate memory 34. In the intermediate memory 34 a particular storage location can e.g. be allocated to each image element of the image sensor array 30. The control apparatus 32, as explained above, induces multiple accessing of the image sensor elements of the image sensor array 30 when necessary. Furthermore, the control apparatus 32 decides in each case whether there is a valid signal from the image sensor elements after the respective detection time. The respective valid signals are stored by the control apparatus 32, together with the information on the respective integration time, at the respective storage location in the intermediate memory 34, i.e. the image memory. For an orderly allocation it is advantageous that each pixel has been accessed for each integration time. It is also advantageous to perform this accessing and the writing into the intermediate memory in parallel. The image information, together with the additional information on the respective integration time, can now be read out of the image memory 34 and then be processed or displayed.

In an alternative implementation of the method according to the present invention to that described above, instead of the long initial integration time t_int_1 depicted in FIGS. 2A and 2B, a short integration time, e.g. t_int_3, can be used at the beginning of the method. A valid output signal would then be understood as one whose voltage has fallen by more than a predetermined percentage in respect of the voltage +U_DD. This percentage could e.g. be 10% of the voltage +U_DD. If the output voltage lies in the invalid range, i.e. if it has fallen by less than 10%, the integration time would be increased, e.g. from t_int_3 to t_int_2. In this way the sensitivity of the image sensor elements of an image sensor array could be increased.

It is obvious that other light-sensitive devices could be used as image sensor elements instead of the photodiode described as long as the optical signal, e.g. the illumination intensity, is detected via a change in the charge of a capacitance over a predetermined time period. Such alternative devices are e.g. bipolar phototransistors or light-sensitive MOS transistors.

The variation in the integration times so long as no valid signal is detected is normally continued until a valid signal is detected. Alternatively, the repetition of the detection with different integration times may be performed only a certain number of times, whereupon e.g. a specified value is used for the illumination intensity.

It is obvious that instead of using the photocurrent directly, the charge of the capacitance can also be changed using a quantity derived from the photocurrent, e.g. one prepared by means of an amplification circuit or the like.

Apart from image detection, the present invention can also be used to advantage in e.g. outdoor supervision methods.

What is claimed is:

1. A method for detecting an image signal by means of an array of photosensitive devices with each of which the charge of a capacitance can be altered, comprising the following steps:

a) detecting an optical signal of each photosensitive device by means of the following substeps:

a1) creating a charge condition of the capacitance with a predetermined voltage, a2) changing the charge of the capacitance either with a photocurrent generated in the photosensitive device by the optical signal or with a quantity derived from the same and detecting the voltage across the capacitance after a predetermined time period, a3) deciding whether the detected voltage lies within a valid range and, if this is so, determining on the basis of the detected voltage a valid signal which characterizes the detected optical signal, and, if this is not so, a4) repeating the steps a1) to a3) with a time period which differs from the predetermined time period either a predetermined number of times or until it is determined in step a3) that the detected voltage lies in a valid range;

b) storing the valid signal, determined for each photosensitive device and characterizing the detected optical signal, together with the time period for which a valid signal has been detected, wherein a predetermined signal is stored if a valid signal characterizing the detected optical signal is not detected in steps a1) to a4); and c) obtaining the image signal from the stored optical signals for the individual photosensitive devices and the respective assigned time periods.

2. A method according to claim 1, wherein the step a1) comprises the charging of the capacitance to the predetermined voltage and in step a2) the capacitance is discharged by the photocurrent or by a quantity derived from the same.

3. A method according to claim 2, wherein in step a3) it is decided that the detected voltage does not lie in the valid range if the detected voltage corresponds to a complete discharge of the capacitance, the time period after which the voltage is detected, which differs from the predetermined time period, being reduced for each repetition.

4. A method according to claim 2, wherein in step a3) it is decided that the detected voltage does not lie in the valid range if the detected voltage corresponds to a small discharge of the capacitance, the time period after which the voltage is detected, which differs from the predetermined time period, being increased for each repetition.

5. A method according to claim 2, wherein a photodiode is used as the photosensitive device, the capacitance being the blocking layer capacitance of the photodiode.

6. A method according to claim 1, wherein in step b) the valid signal is stored in each case in an intermediate memory together with the time period used for detecting said signal.

* * * * *